(12) United States Patent
Calvarese et al.

(10) Patent No.: US 11,079,469 B2
(45) Date of Patent: Aug. 3, 2021

(54) ULTRASONIC LOCATIONING SYSTEM USING A DOUBLY SYMMETRICAL TRANSMISSION SEQUENCE

(71) Applicant: SYMBOL TECHNOLOGIES, LLC, Lincolnshire, IL (US)

(72) Inventors: Russell Calvarese, Stony Brook, NY (US); Richard J. Lavery, Huntington, NY (US); Dammika Prasad Wijethunga, Via Dehiowita (LK)

(73) Assignee: Symbol Technologies, LLC, Holtsville, NY (US)

(*) Notice: Subject to any disclaimer, the term of this patent is extended or adjusted under 35 U.S.C. 154(b) by 222 days.

(21) Appl. No.: 15/591,272

(22) Filed: May 10, 2017

(65) Prior Publication Data

US 2018/0329025 A1   Nov. 15, 2018

(51) Int. Cl.
| | | |
|---|---|---|
| *G01S 5/30* | (2006.01) | |
| *G01S 5/20* | (2006.01) | |
| *G01S 1/72* | (2006.01) | |
| *G01S 1/76* | (2006.01) | |
| *G01S 5/00* | (2006.01) | |
| *G01S 5/18* | (2006.01) | |
| *G01S 1/74* | (2006.01) | |

(52) U.S. Cl.
CPC .............. *G01S 5/30* (2013.01); *G01S 1/74* (2013.01); *G01S 1/76* (2013.01); *G01S 5/0036* (2013.01); *G01S 5/18* (2013.01)

(58) Field of Classification Search
CPC ...... G01S 5/30; G01S 1/72; G01S 5/20; G01S 5/18; G01S 5/0036; G01S 1/76; G01S 1/74

See application file for complete search history.

(56) References Cited

U.S. PATENT DOCUMENTS

| | | |
|---|---|---|
| 6,141,293 A | 10/2000 | Amorai-Moriya et al. |
| 9,269,152 B1* | 2/2016 | Worley, III ........... G06T 19/006 |
| 2006/0077759 A1 | 4/2006 | Holm |
| 2015/0117153 A1* | 4/2015 | Calvarese ............... G01S 11/14 |
| | | 367/117 |
| 2015/0153450 A1 | 6/2015 | Vartanian et al. |

OTHER PUBLICATIONS

Piontek et al, "Improving the accuracy of ultrasound-based loccalisation systems", Pers Ubiquit Comput, vol. 11, pp. 439-449 (Year: 2007).*

International Search Report and Written Opinion for International Patent Application No. PCT/US2018/029520 dated Jul. 3, 2018.

\* cited by examiner

*Primary Examiner* — Ian J Lobo
(74) *Attorney, Agent, or Firm* — Yuri Astvatsaturov

(57) ABSTRACT

A method and apparatus for locating a target in a venue is described. A backend controller activates transmitters in a venue to send burst signals using a double symmetry configuration formed of a plurality of separate transmitter groups. The backend controller activates the transmitters into a second, different configuration for bursting. The resulting location signal information from each configuration is obtained by the backend controller, which then more accurately determines the location of the target in the venue.

17 Claims, 8 Drawing Sheets

FIG. 5

ULTRASONIC LOCATIONING SYSTEM USING A DOUBLY SYMMETRICAL TRANSMISSION SEQUENCE

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A system using ultrasonic transmitters can determine the location of devices that can receive ultrasonic signals, devices such as mobile devices present within a retail, factory, or warehouse environment, for example. The ultrasonic transmitter typically includes an emitter (e.g. transducer or speaker) that can transmit ultrasonic energy in a short burst that can be received by a transducer (e.g. microphone) in the mobile device. For example, today's unmodified smart phones have audio hardware and circuitry that is capable of receiving ultrasonic signals in the 20-22 kHz frequency range. Further, the use of several ultrasonic transmitters within the environment can be used to provide a specific location of a particular device using techniques known in the art that incorporate triangulation, trilateration, multilateration, and the like.

In an ultrasonic locationing system, how often a transmitter transmits is an important design parameter that not only sets the refresh rate for position updates, but, in turn, establishes the overall position accuracy when measuring a device moving within a scanned area. Ultrasonic pulses must be spaced out in time to allow reflections to die down in amplitude below the detection threshold, before a new burst signal is sent and a new measurement takes place. These times, termed reverberation times, can be several hundred milliseconds in a typical retail environment.

For existing ultrasonic locationing systems, however, transmitter scheduling is lacking in a number of ways. Particularly problematic is the concept of scaling. As retail, factory, and warehouse facilities grow in size, ultrasonic locationing systems increase in size. But to scale an ultrasonic locationing system to cover an entire retail space, for example, can require a large number of locationing transmitters; and the larger the number of transmitters, the greater the time needed to sequence each of the transmitters one after the other. Because of this, position update rate and accuracy are reduced.

Accordingly, there is a need for an improved ultrasonic locationing system capable of handling large scale coverage areas.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is an illustration, representing a top view, of a sub-room grouping of the transmitters of FIG. 2, in an example of a sub-room mode.

Figure 1:
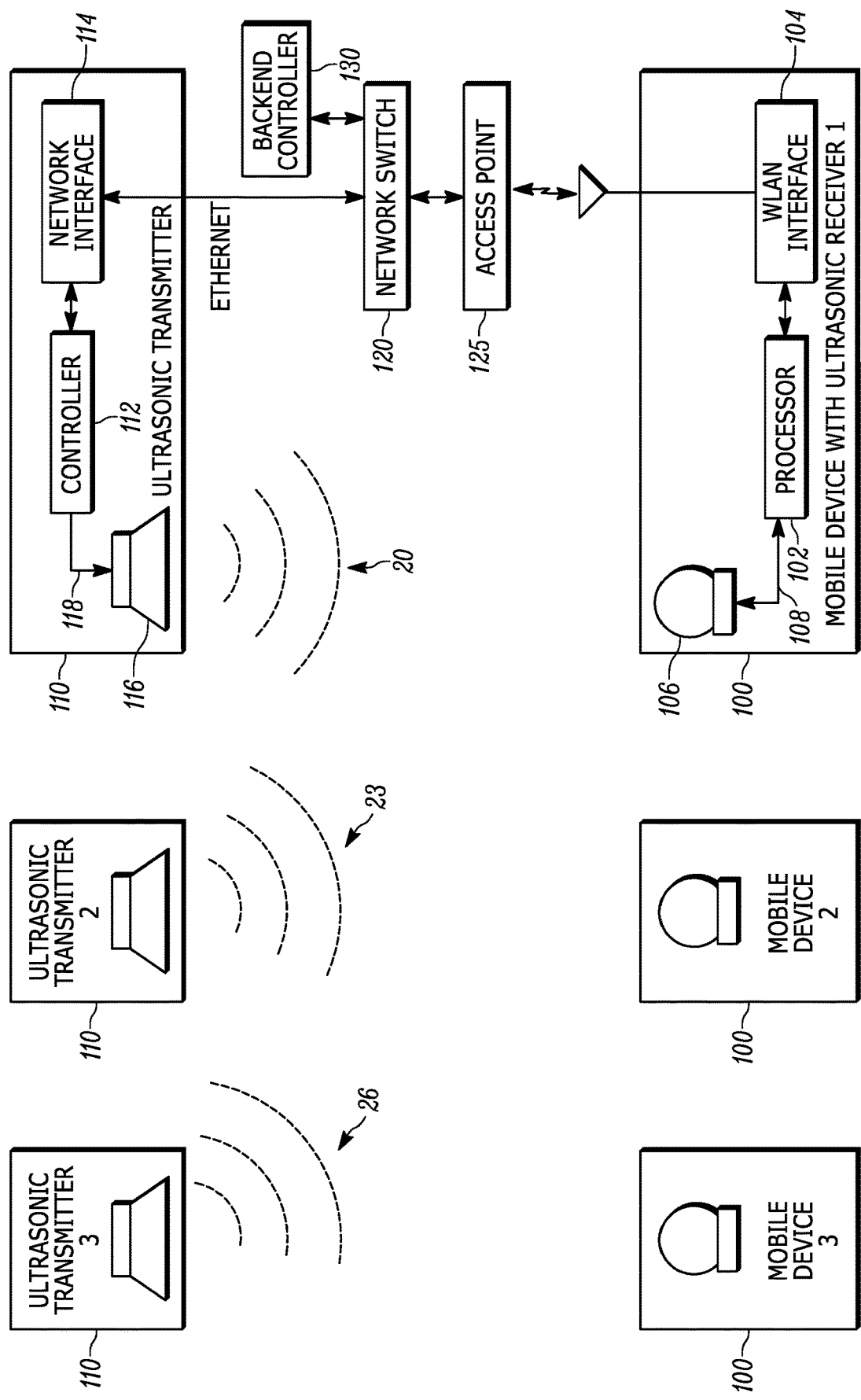
FIG. 1 is a block diagram of an ultrasonic locationing system, in accordance with an example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to some embodiments of the present invention, an improved technique is described to provide faster and more accurate locationing of a mobile device in a scan area, such as a retail space, warehouse, or factory. In particular, a locationing system employs a unique reconfiguring of transmitters for faster identification of the position of one or more mobile devices. The locationing system coordinates operation of the transmitters in a grouped manner to send ultrasonic ranging pulses in the form of burst signals, such as acoustic pulses or short tones. The sequencing of these burst signals may be performed in an optimizing and static manner, such that the sequencing allows for the same performance speeds irrespective of the number of transmitters in a venue and irrespective of the venues size.

Although an ultrasonic locationing system should have high accuracy, that accuracy decreases as the number of transmitter becomes excessive. The configuration and parallel sequencing techniques herein, however, may help ensure that an increased number of transmitters may be used without sacrificing the amount of time it takes to identify a target (e.g., a mobile device) or, correspondingly, the position accuracy of that identification.

In some embodiments, a locationing system includes a backend controller that controls operation of a plurality of ultrasonic transmitters dispersed throughout a venue. The backend controller controls these transmitters to send burst signals in a sequential manner, using designated groups of transmitters that transmit simultaneously according to one or more lines of symmetry. These transmitters, operated in what is termed herein as a symmetry mode, are grouped together to establish symmetry along different symmetry lines. An example implementation of a symmetry mode is a double symmetry mode, in which the transmitters are grouped in a venue based a two-axis symmetry, e.g., based on both a horizontal symmetry and a vertical symmetry line. That is, in some examples, the transmitters are divided into groups, where each transmitter group exhibit two-axis symmetry, and where further each group contains a different collection of the transmits in the venue.

With ultrasonic transmitters configured in the symmetry mode, the backend controller instructs the transmitters in the first group to fire, i.e., to send burst signals in the form of acoustic pulses, tones, etc. After the first transmitter group fires, a next group is made to fire. The backend controller controls this process by instructing each transmitter group to fire in sequence, one after another, in their respective allotted timeframes.

In some examples, the backend controller determines the symmetry lines, whether two-axes using vertical and horizontal lines or other symmetry lines, by first sub-dividing a venue into n sub-rooms, wherein n is an integer equal to 2 or greater. These sub-rooms may be determined by the backend controller at run time, they may be pre-stored in a layout configuration file accessed by the backend controller during initialization, or they may be pre-stored and updated during operation. In some examples, a layout configuration file stores the sub-room data for the venue, data setting forth the symmetry transmitter groups, and data setting forth the sub-room transmitter groups.

In the symmetry mode, each transmitter group may be patterned in such a way that the entire venue is covered when the transmitter group fires. This can be achieved by having each transmitter group formed to include at least one transmitter in each of the sub-rooms of the venue. As each transmitter group fires, all sub-rooms are probed and at the same time. The backend controller instructs this sequential probing until all symmetry mode transmitter groups have fired.

Once all symmetry mode transmitter groups have fired, the backend controller may determine a position of the target by using triangulation, trilateration, and/or multilateration, based on locationing data obtained from the target. For example, the target may record a timestamp each time a burst signal is received at the target. Thus, the target would perform a timestamp for each symmetry mode transmitter group, according to each transmitter group timeframe. The target sends the timestamps to the backend controller through a wireless network. The backend controller records those timestamps and uses triangulation, trilateration, and/or multilateration to identify which symmetry mode transmitter group is closest to the target.

In some further example embodiments, after transmitting the burst signals during the symmetry mode, the backend controller may switch the transmitters into a second mode, where the transmitters are grouped into a different grouping pattern. That second grouping pattern may be derived from the same sub-rooms n stored in the layout configuration file. Or that second grouping pattern may be derived from a different configuration of the transmitters in the venue. Either way, in this second mode, the transmitters are grouped in what is termed herein a sub-room mode, in which the transmitters do not exhibit the same multiple-axis symmetry as in the symmetry mode. Indeed, in some examples of the sub-room mode, the transmitters in a group do not exhibit any symmetry with one another, instead only the group itself may exhibit a symmetry with other groups, or even the group itself may not exhibit any symmetry. In any event, as with the symmetry mode, in the sub-room mode, each transmitter group will transmit its burst signals during an allotted timeframe, and the timeframes for the various groups are fired in a sequential manner until all transmitter groups of the sub-room mode have fired.

As with the symmetry mode, the backend controller may collect timestamp information from the target through the sequential group firing of the sub-room mode. From this information, the backend controller determines which transmitter group in the sub-room mode is closest to the target.

The backend controller collects location signal information (e.g., timestamp information) in response to the burst signals of both the symmetry mode and the sub-room mode, and the backend controller determines a location of the target, e.g., using triangulation, trilateration, and/or multilateration.

Figure 4:
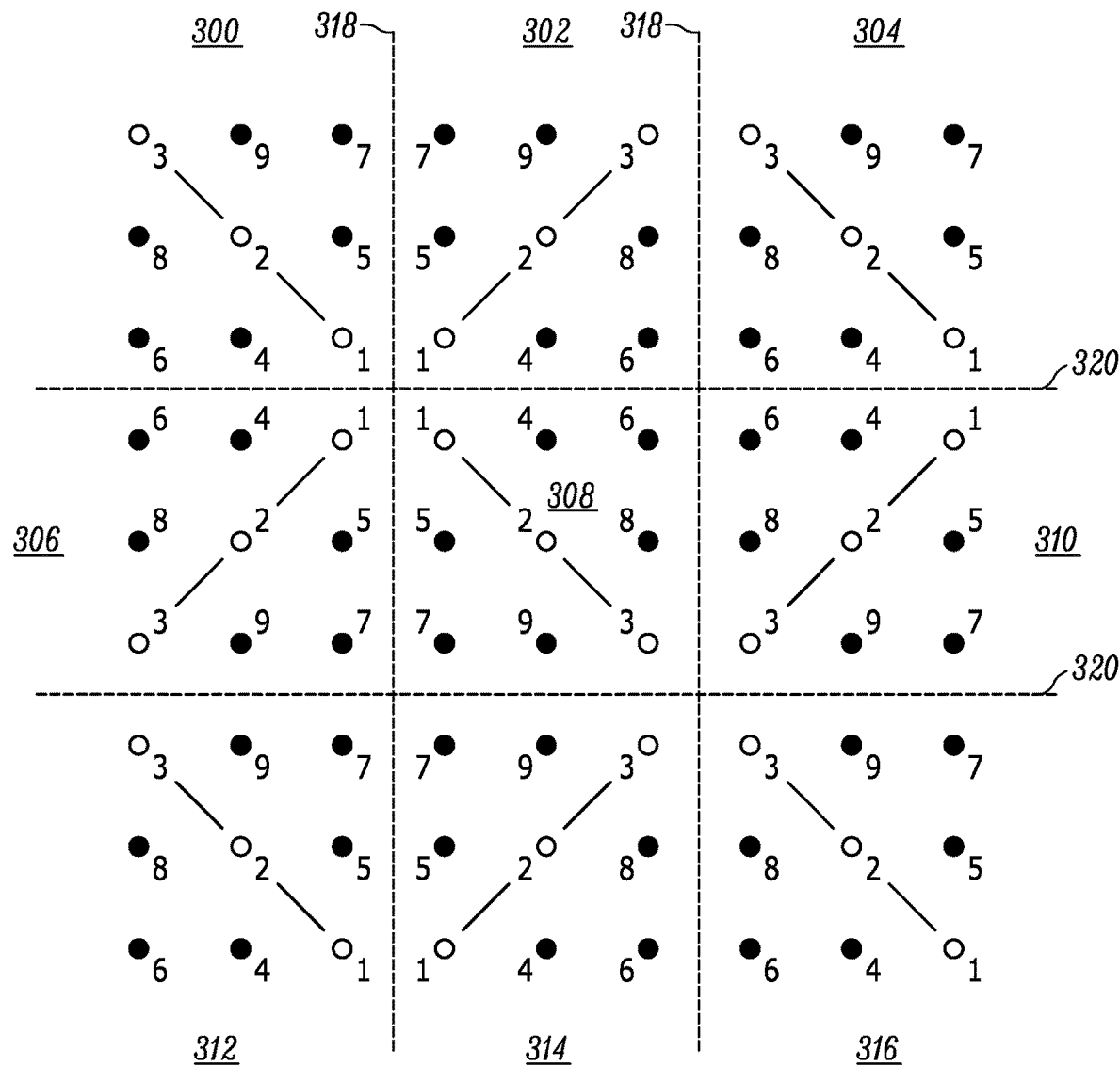
FIG. 4 is an illustration, representing a top view, of a symmetry mode grouping of the transmitters of FIG. 2, in an example of a double symmetry mode.

The techniques described herein facilitate various performance advantages. By using a symmetry mode configuration, in particular a double symmetry mode, the system may help with faster identification of a moving target, such as a mobile device. For example, double mirror symmetry (i.e., a transmitter firing group configuration having both horizontal and vertical symmetry, as shown in FIG. 4) ensures that an observer (e.g., a transmitter) is always closer to an object (e.g., a target or mobile device) than the observer is to the mirror image of that object. Furthermore, the symmetry mode ensures that each all sub-rooms of a venue are scanned simultaneously, thus reducing the time before a given transmitter transmits again and thus ensuring that the entire venue is ostensibly covered each burst.

Any number of targets in a venue may be located with the present techniques. By way of example, the target to be located may be a mobile device from a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, personal computers, and personal digital assistants, and the like, all referred to herein as a device. Each device comprises a processor that can be further coupled to a keypad, a speaker, a microphone, a display, signal processors, and other features, as are known in the art and therefore not shown.

FIG. 1 is a block diagram of an ultrasonic locationing system, in accordance with this document. An ultrasonic transponder such as a piezoelectric speaker or emitter 116 can be implemented within an ultrasonic transmitter 110. The emitter can send a short burst of ultrasonic sound (e.g. an ultrasonic sound pressure wave 20) for a mobile device 100 to hear within the environment. The mobile device 100 can include a transducer such as an existing microphone 106 to receive the burst 20. The mobile device also includes existing audio circuitry to convert the burst into an electrical signal 108. The mobile device also includes an existing processor 102 to convert and process the signal. The processor 102 can also be coupled to a wireless local area network interface 104 for wireless communication with other devices in a communication network.

The communication network can include local and wide-area wireless networks, wired networks, or other IEEE 802.11 or Wi-Fi™ wireless communication systems, including virtual and extended virtual networks. It is envisioned that the communication network includes a backend controller/scheduler 130 that performs network control and provides the locationing determinations. The backend controller 130 further controls operation of each of the ultrasonic transmitters 110 to operate in a synchronized manner and configures the transmitters 110 to send ultrasonic bursts (also termed pulses herein) according to a double symmetry configuration, as discussed in some embodiments herein. The backend controller 130 can be connected to a network switch 120 which can be wired (e.g. an Ethernet interface connection) or wirelessly (e.g. IEEE's 802.11 or Wi-Fi™) connected to the plurality of ultrasonic transmitters 110, and at least one wireless communication link such as a wireless access point 125 used for communicating with the mobile devices 100.

In order to provide more accurate locationing ability, using a flight time technique for example, a large plurality of the ultrasonic transmitters 110 may be used within an environment, each transmitter carrying an emitter 116. For unobtrusiveness and clear signalling, the transmitters can be affixed to a ceiling of the environment, where the position of each transmitter is fixed and known by the backend controller 130. The configuration of FIG. 1 can use flight time information of multiple bursts from different transmitters 110 to locate the mobile device 100. As the location and position of these transmitters 110 is known and fixed, the different signals received by the mobile device microphone from each transmitter can be used to locate and track the position of the mobile device using a suitable locationing technique such as triangulation, trilateration, or multilateration, for example.

In practice, the mobile device 100 may not know which particular transmitter is the one emitting the ultrasonic burst. Therefore, the backend controller 130 controls operation of the transmitters 110, where the backend controller knows which transmitter group is transmitting at any given time and the layout of the transmitters in that group. The backend controller 130 has stored information that layout of the transmitters in the symmetry mode is different than the layout in the sub-room mode, for example. The backend controller has these layouts stored, e.g., in configuration files.

As discussed further, the backend controller 130 may include a scheduler and may communicate with each of the ultrasonic transmitters to group the transmitters based on different transmitter group reconfigurations. To optimize the reach of the transmitter groupings, the groupings may be defined by a double symmetry, in which all the transmitters in any particular group exhibit symmetry about two chosen symmetry lines or symmetry planes (e.g., one horizontal and one vertical).

Upon receiving a burst from a group of transmitters, the device 100 can communicate with the backend controller 130 over the communication network, through the access point 125, that the device 100 has received the burst. The backend controller 130 will then know that the burst came from the particular transmitter group, by tracking the timeframe over which the burst signals were sent and comparing that timeframe to the timestamp received from the target, that timestamp representing the time at which the target device 100 receives the burst signal. This process repeats for the next transmitter group, the next transmitter group after that, and so on, until all transmitter groups in the symmetry mode have transmitted their respective burst signals. The backend controller 130 receives and stores the timestamps received each sequential timeframe, from which the backend controller 130 determines the position of the target in the venue or at least determines which of the symmetry mode transmitter groups is closest to the device 100.

Figure 2:
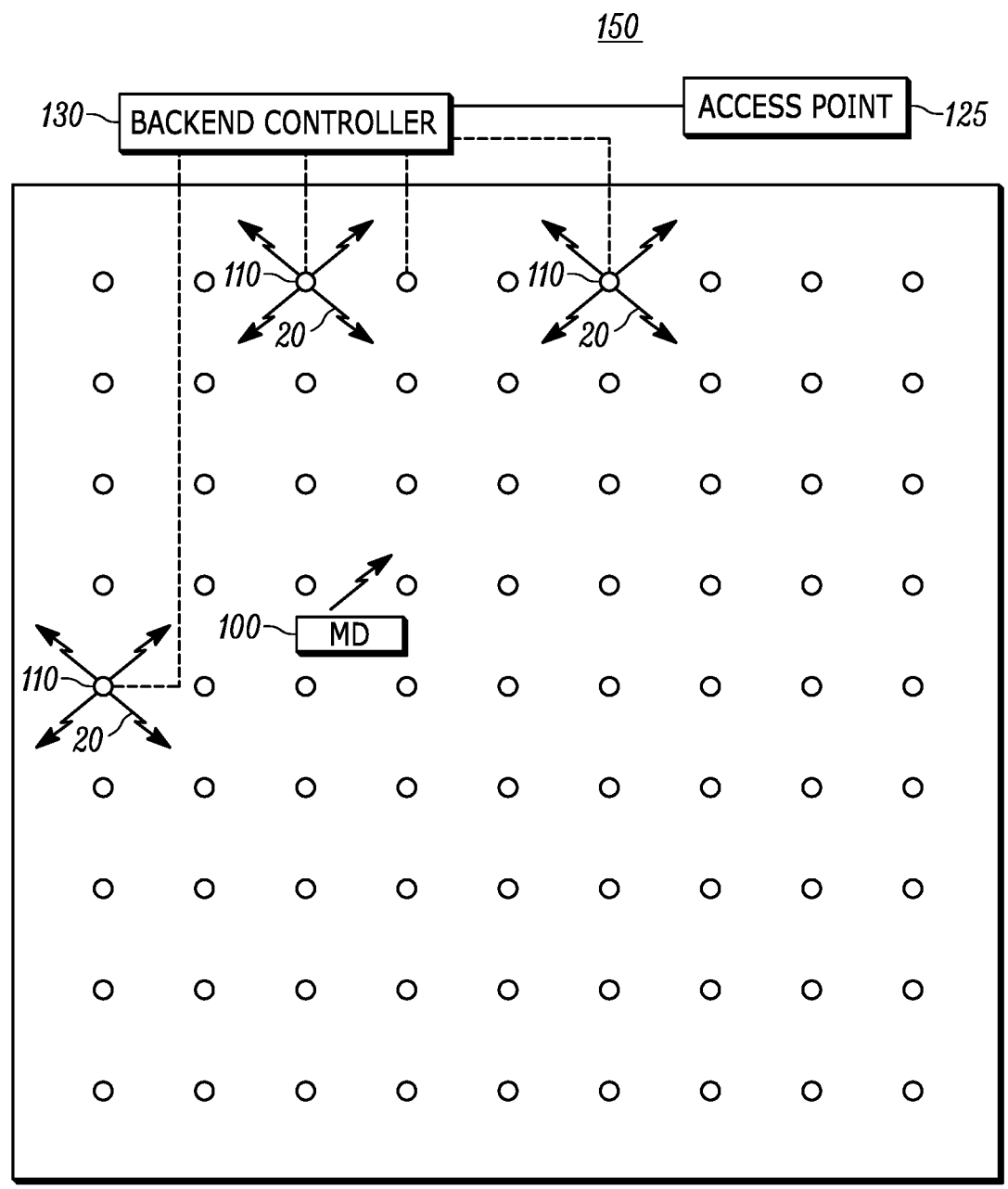
FIG. 2 is a block diagram, representing a top view, of the ultrasonic transmitters of FIG. 1 showing the physical layout configuration of the transmitters in a venue, in accordance with an example embodiment.

FIG. 2 illustrates an example environment (venue) 150 having disposed therein a plurality of ultrasonic transmitters 110, only some of which are labelled for convenience purposes. Further, an example of the mobile device (MD) 100 is shown. The transmitters 110 are shown in a physical layout configuration in a venue, such as a building.

Figure 3:
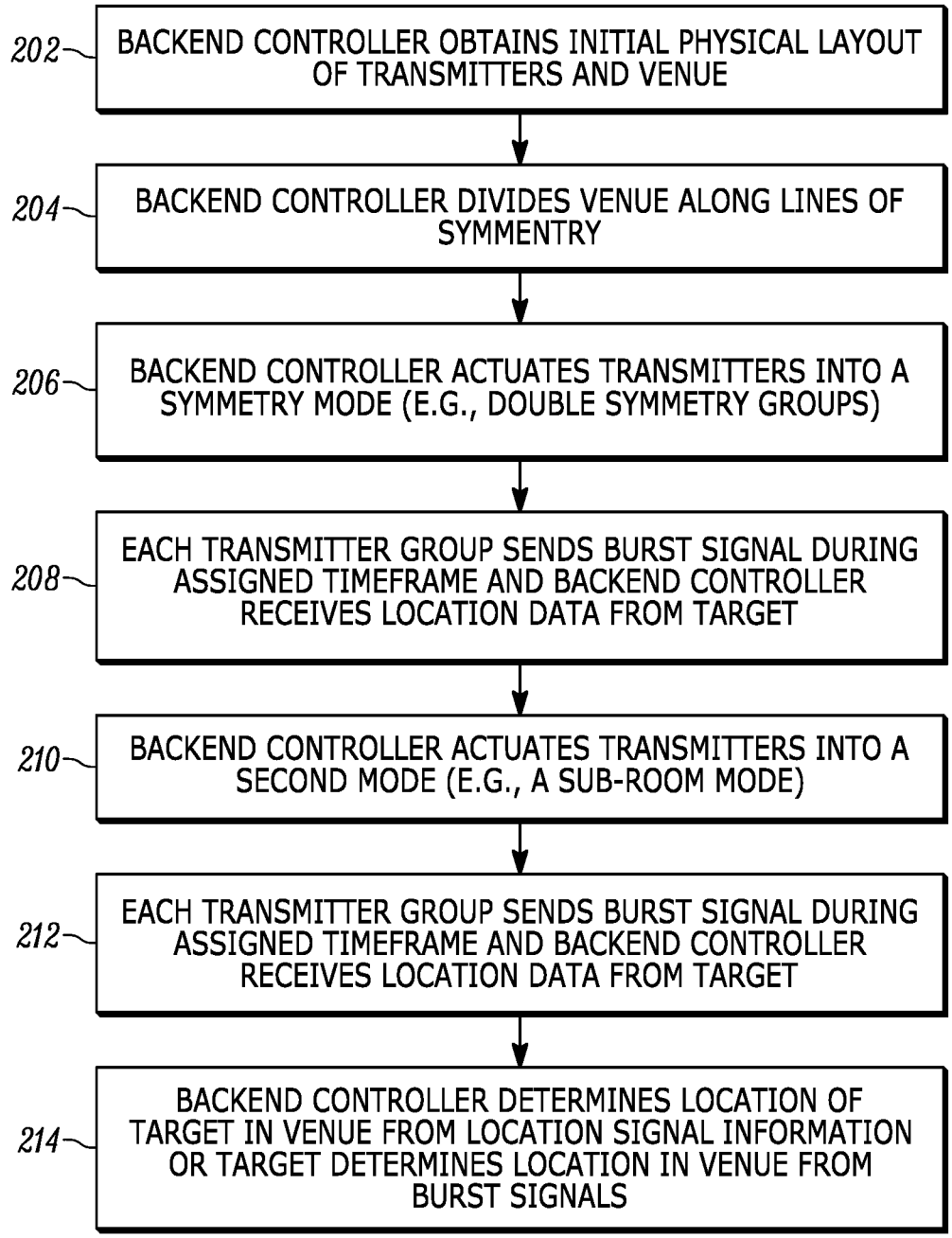
FIG. 3 is a representation of a flow diagram, in accordance with an example embodiment.

FIG. 3 illustrates a flowchart representative of an example process 200 performed by the backend controller 130, or under the control thereof, to achieve optimized locationing of the mobile device 100 in the environment 150. The backend controller (block 202) obtains initial physical layout data for the ultrasonic transmitters 110 and for the environment 150. This physical layout data may include the position of the transmitters 110 within the environment 150, the number of transmitters 110, and, in some examples, the dimensions of the environment 150.

The backend controller (block 204) takes the physical layout data and divides the environment 150 into virtual sub-regions or sub-rooms. As used herein, sub-rooms need not be physical rooms. The sub-rooms may be areas within the environment 150. Each sub-room may be the same size in area, or the sub-rooms may be differently sized. In some examples, the sub-rooms do not represent areas, but rather a sub-room simply defines a particular grouping of adjacent transmitters 110 having a corresponding firing or transmitting order in the venue. In examples, where the environment 150 is divided, that division may be done based on the layout data of the transmitters 110, the layout data of the environment 150, or the layout data from both. In some embodiments, the backend controller divides the environment 150 into equally-sized areas of the same geometry (e.g., "cells"), such as rectangular, square, or diamond shaped cells. In other examples, the backend controller may divide the environment 150 into cells of different, but complementary geometries, for example, some cells having a rectangular shape and others have complimentary square shapes.

FIG. 4 illustrates an example sub-room layout used by the backend controller (by block 204) for the environment 150. As shown, the transmitters 110 of the environment 150 are divided into nine (9) sub-rooms 300-316, each of equal size and each square in shape. To reconfigure the transmitters 110 into these sub-rooms 300-316, orthogonal symmetry lines were used. A first symmetry line 318 corresponds to vertically extending lines, while a second symmetry line 320 corresponds to horizontally extending lines. The number of symmetry lines determines the number of sub-rooms. In the illustrated example, the symmetry lines 318 and 320 are orthogonal to each other, which facilitates performing a double symmetry reconfiguration described further. While for this particular illustrated example, the symmetry lines are along vertical and horizontal orientations, indeed any number of orthogonal symmetry lines can be made, such as a 45° rotated symmetry.

The sub-rooms 300-316 may be stored in a layout configuration file accessed by the backend controller 130. While in other examples, the sub-rooms 300-316 are determined by the backend controller 130 during run time.

With the sub-rooms set, the backend controller 130 operates the transmitters in two different burst signal modes to identify the location of the mobile device 100, a symmetry mode and a sub-room mode.

To operate in the symmetry mode, the backend controller 130 assigns each of the transmitters 110 to one of a plurality of symmetry mode transmitter groups (block 206). FIG. 4 illustrates an example in which the backend controller 130 has divided the total group of transmitters 110 into nine (9) different groups, each labelled Group 1, 2, 3, ..., 7, 8, and 9. All transmitters reconfigured into double symmetry group 1 are labelled by 1 in FIG. 4. The backend controller 130 is configured such that it assigns each transmitter to only one of these symmetry groups and such that each sub-room has only one transmitter from each symmetry group within that sub-room. For example, the sub-room 300 has nine (9) transmitters, and in the double symmetry mode, the backend controller has configured those nine transmitters so that each one is assigned to a different symmetry transmitter group. In the illustrated example, the symmetry is a double symmetry.

Referring again to FIG. 2, at block 206, the backend controller has assigned the transmitters 110 such that a double symmetry about the symmetry lines 318 and 320 is established. In the illustrated example, that double symmetry is a particular type termed-herein a double mirror symmetry. By configuring the transmitters into a double symmetry configuration, the backend controller ensures that each transmitter in a group is symmetrical with each other transmitter in that group, i.e., symmetrical about axis 318 and symmetrical about axis 320. For example, looking at sub-room 300, transmitter 110 assigned to group 3 is symmetrical about axial line 320 with the group 3 transmitter in sub-room 306. Similarly, the group 3 transmitter in sub-room 300 is symmetrical about line 318 with the group 3 transmitter in sub-room 302. This double symmetry is achieved for each transmitter throughout the entire environment 150.

In the symmetry mode, the backend controller (block 208) instructs a first group of transmitters to transmit an ultrasound burst signal. In some examples, the backend controller is configured to wait for and receive response signals from the mobile device, the response single indicating when the mobile device received the burst signal. In some embodiments, the backend controller instructs only one symmetry transmitter group (Group 1-9 in FIG. 4) to transmit at a time. After each transmitter group sends a burst signal, a next transmitter group will send its burst signal. And the backend controller may repeat the process until each group has transmitted a burst signal.

The ordering of firing of the different transmitter groups may vary. The double symmetry mode establishes that the entire environment 150 can be canvassed quickly without need to activate transmitter groups in any particular order. In some embodiments, the transmitter groups can be activated according to an ordering pattern of Group 1, then Group 2, 3, 4, 5, 6, 7, 8, and 9; in other examples, the ordering pattern could be Group 2, then Group 4, 6, 8, 1, 3, 5, 7, and 9; in other examples, any other ordering pattern could be used. Furthermore, while in these examples, each group is activated once before the groups are repeated, in some embodiments transmitter groups may be activated in a variable manner, e.g., according to any non-consuming ordering, such as Group 1, then Group 2, 1, 2, 4, and 5, until the mobile device has been sufficiently locationed.

The backend controller at block 208 controls the process to separately activate each of the transmitter groups to transmit burst signals. This process occurs for each transmitter group, under control of the backend processor, such that at the completion of block 208, the backend controller has received timestamps from the mobile device corresponding to all the transmitter groups of the symmetry mode. After all transmitter groups have fired during the double symmetry mode, the backend controller then determines which transmitter group had the ultrasonic transmitter closest to the target. For example, if transmitter Group 3 has the shortest flight time (i.e., time from burst to received timestamp) from among all transmitter groups, then the backend controller determines that one of the transmitters in Group 3 is closest to the actual location of the mobile device.

The backend controller then enters a second mode, e.g., a sub-room mode, in which the backend controller reconfigures the transmitters 110 into a sub-room layout configuration, e.g., that of block 204. In the sub-room mode (210), the backend controller instructs each sub-room of transmitters to separately and in a sequential manner send out burst signals to further determine which sub-room the mobile device 100 is in and where it is within that sub-room.

Figure 5:
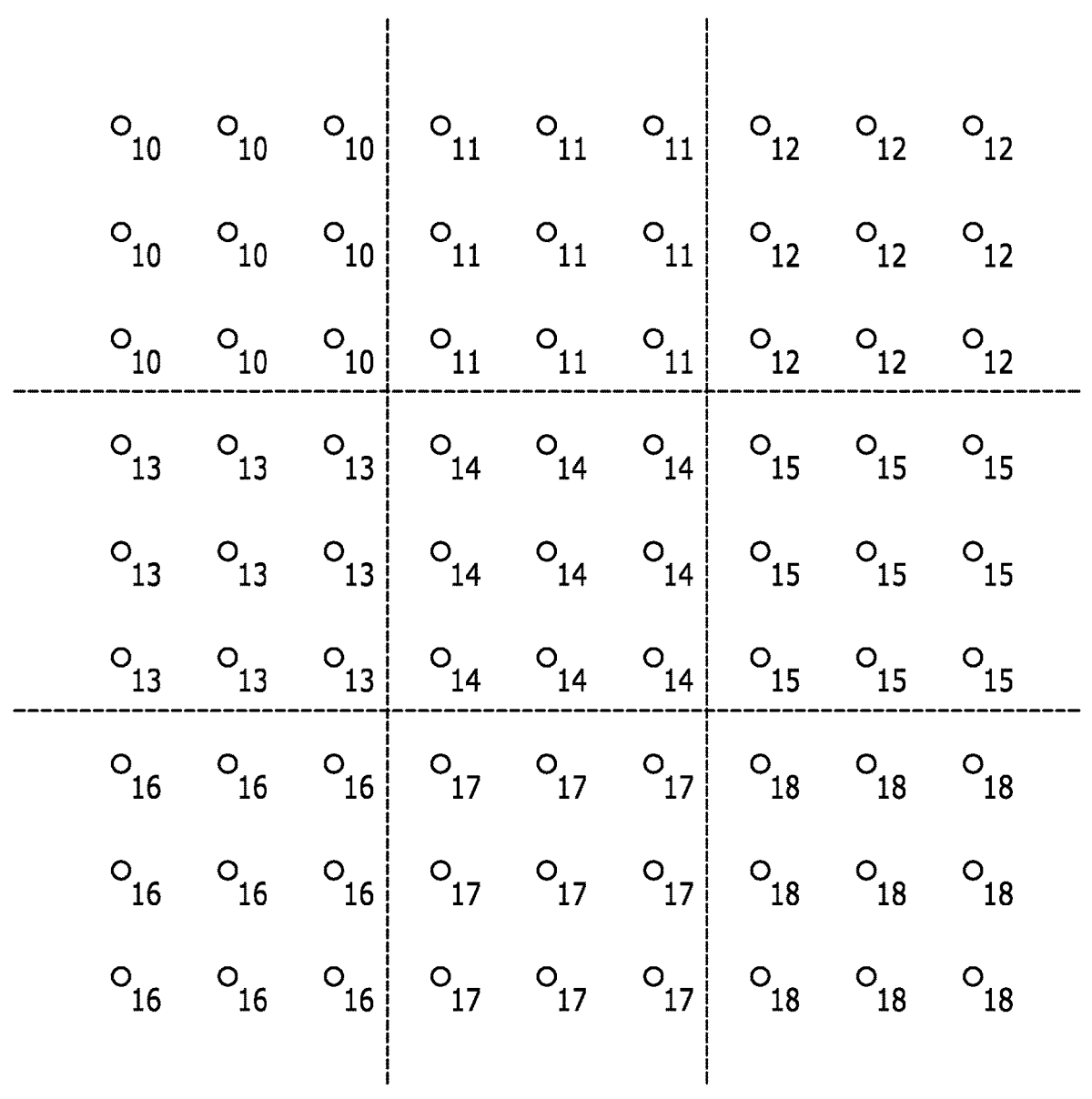

FIG. 5 illustrates an example of each of the transmitters 110 configured into groups defined by the sub-rooms 300-316 (block 210). In the sub-room mode (block 212), the backend controller instructs each of the transmitter groups, Groups 10-18 in the illustrated example, to send burst signals, where, as with the double symmetry mode, each subsequent group is controlled to wait a refresh period (e.g., 200 ms) before sending its respective burst.

In the sub-room mode, the transmitters for each sub-room group transmit burst signals and the mobile device records timestamps for when the burst signal is received. If a mobile device is not in a particular sub-room, then the mobile device may record no timestamp during a timeframe. If a mobile device is located in another sub-room but near the sub-room active at the time, then the mobile device may record a timestamp, where that timestamp represents a flight time that is longer than the flight time for the sub-room group that actually contains the mobile device.

In the illustrated example, the process repeats for multiple sub-rooms, such as for each of the sub-rooms, identifying a corresponding sub-room in which the mobile device is located. The target records a timestamp upon receipt of the burst signal and transmits that timestamp to the backend controller (block 212). The backend controller records the received timestamps as the transmitter groups are fired in sequential order.

From the received timestamp information, during both the symmetry mode and the sub-room mode, the backend controller determines the location of the mobile device 100 at block 214. For example, the backend controller identifies which double symmetry transmitter group produced the shortest flight time and which sub-room produced the shortest flight time. Since the sub-room has only one transmitter from each double symmetry transmitter group, the backend controller is able to determine the sub-room and a corresponding transmitter within the sub-room nearest the mobile device.

Figure 6:
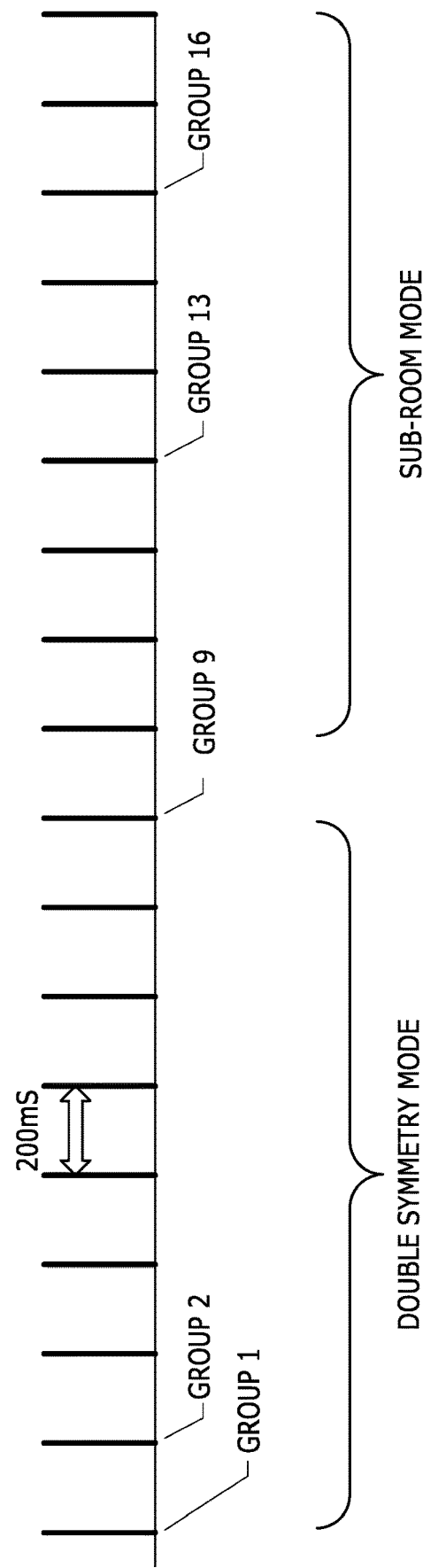
FIG. 6 is a graphical representation of a timing diagram showing a double symmetry mode and a sub-room mode, in an example embodiment.

FIG. 6 illustrates an example of a timing diagram of the transmitter group burst signal transmissions for both the double symmetry mode and the sub-room mode for the example embodiment of FIGS. 4 and 5. Each double symmetry transmitter group transmits its burst signal over a respective double symmetry timeframe, which is shown as a 200 ms timeframe in the illustrated example. After all the Groups 1-9 in the double symmetry mode have transmitted their burst signal, during respective 200 ms timeframes, and the resulting location signal information has been obtained, the backend controller reconfigures the transmitters into the sub-room mode, and each sub-room Group 10-18 transmits its burst signals according to that mode, during respective 200 ms timeframes.

In the illustrated embodiment, the entire locationing process will take approximately 200 ms×18 group timeframes or 3.6 seconds. The amount of time will depend on the size of the environment, the number of transmitter groups, and the sub-room mode. As those of skill in the art will realize, the ultrasound locationing technique described herein may result in a significantly shortened locationing cycle, as opposed to sequential activation of each transmitter in the venue, which in the above example would take 200 ms×81 individual transmitter timeframes or 16.2 seconds. Therefore, the double symmetry and sub-room transmitter activation technique described herein facilitate deployment of large numbers of ultrasound locationing transmitters that may be needed to cover large venues.

While in the illustrated example, the sub-room configuration used by block 210 is the same as the sub-room configuration used by block 204, in other examples, a different sub-room configuration may be used for the block 210. For example, the backend controller may use transmitter groups that are larger or smaller in size for block 210 than that of block 204, where in some examples that change in size may be determined dynamically based on the locationing information data received during the double symmetry mode.

Figure 7:
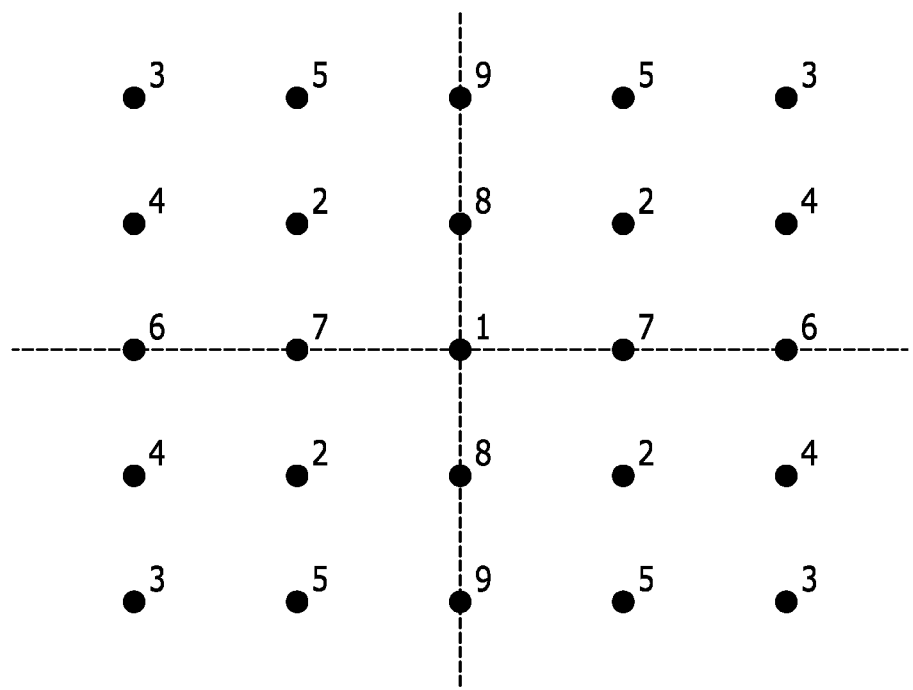
FIG. 7 is an illustration, representing a top view, of a double symmetry mode, where the lines of symmetry fall on the lines of transmitters rather than between lines of transmitters, as shown FIG. 4.
Figure 8:
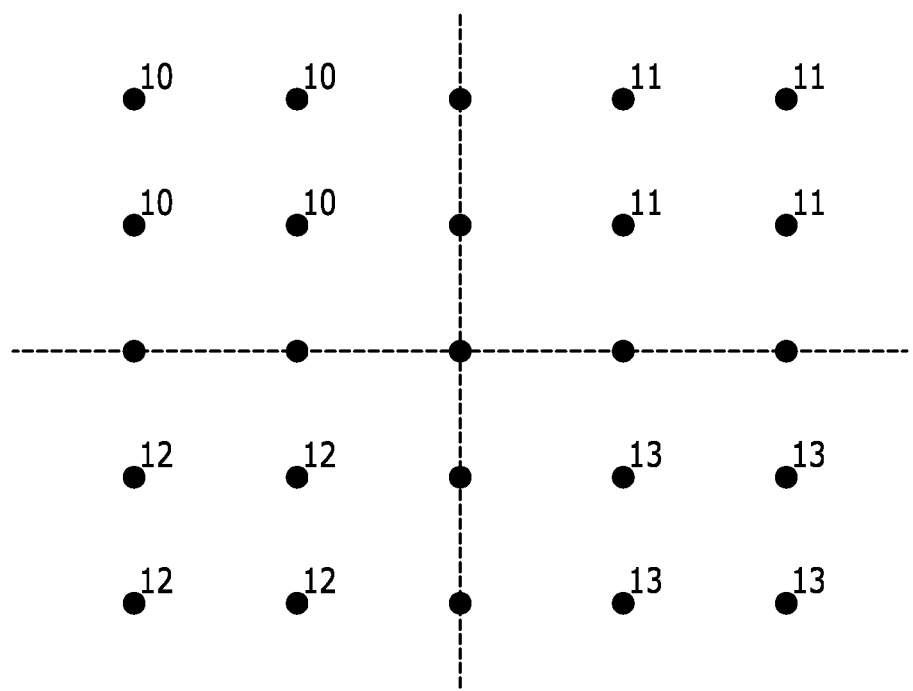
FIG. 8 is an illustration, representing a top view, of a sub-room mode where the lines of symmetry fall on the lines of transmitters rather than between lines of transmitters, as shown in FIG. 5.

In the example embodiments of FIGS. 4 and 5, the symmetry lines bisect between adjacent transmitters, vertically and horizontally. In other embodiments, symmetry lines may align with transmitters, e.g., with symmetry lines that align with columns and rows of transmitters as in FIG. 7 showing transmitter groups for a double symmetry mode and as in FIG. 8 showing the sub-room mode transmitter groupings where transmitters aligned with symmetry lines are not included in the sub-room bursts.

Figure 9:
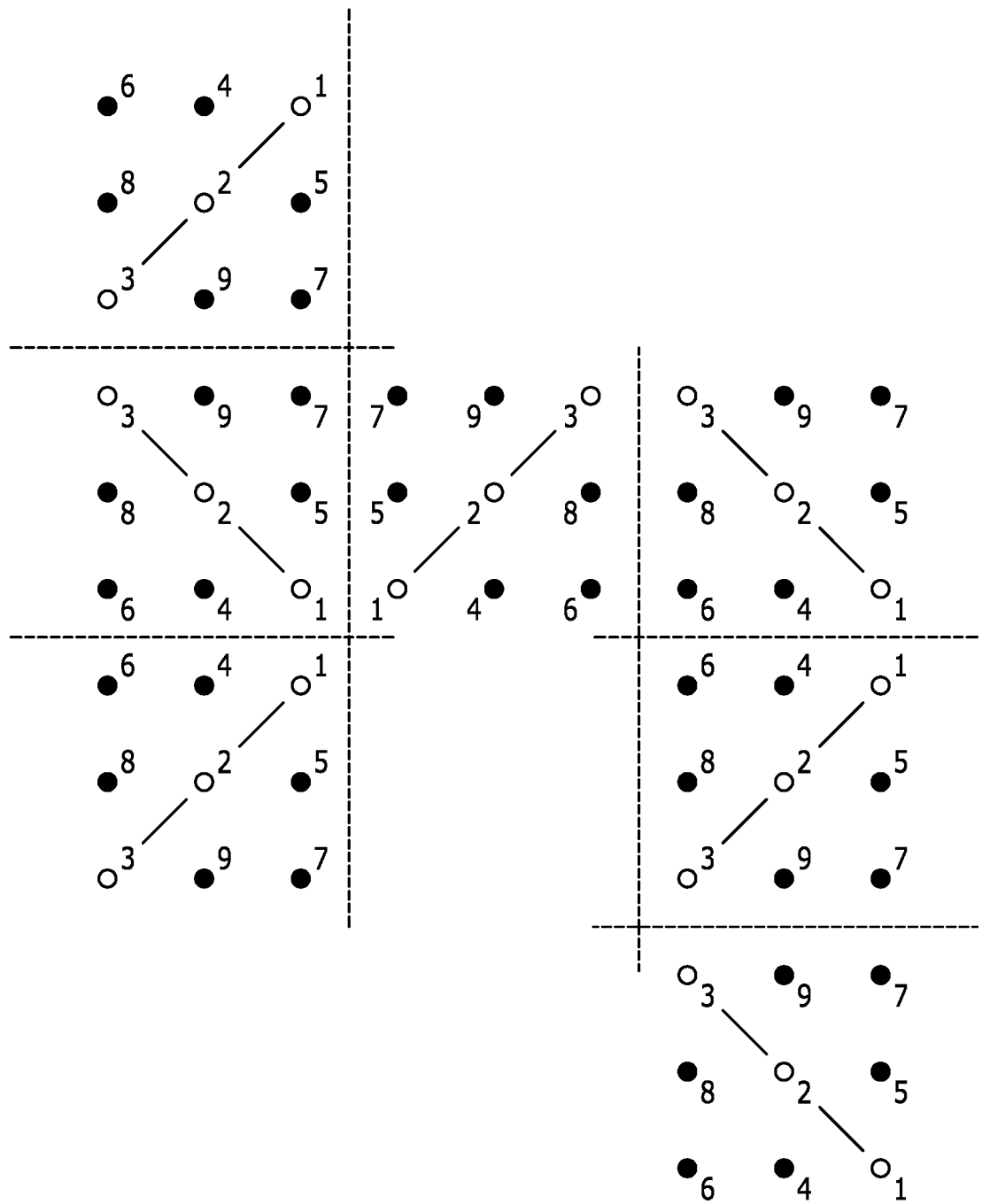
FIG. 9 is an illustration, representing a top view, of a double symmetry mode of a venue differently shaped than the venue of FIG. 2, showing that patterns of the double symmetry mode and sub-room mode can be transposed horizontally and vertically to cover differently shaped venues.

The techniques described herein are scalable and adaptable to any number of environment layout configurations. FIG. 9 illustrates another example environment, where a backend controller has configured transmitters into a double symmetry configuration that takes into account a hallway or other room between two adjacent rectangular shaped rooms. Operation of the location system for this configuration would be in accord with the other examples herein.

In some embodiments, the backend controller can operate the double symmetry mode and the sub-room mode in any order. Furthermore, the sequential firing of the transmitter groups in the double symmetry mode (or those of the sub-room mode) may be altered based on the venue. In some embodiments, the firing order of transmitters groups can be changed to adapt to the size and shape of the venue itself. For example, a venue according to FIG. 9 may have a different ordering of double symmetry group timeframes than that of FIGS. 4 and 5. A configuration file may be accessed by the backend controller and used to pre-set transmitter group ordering for different venue shapes, for example.

Any number of transmitter groups may be used for the double symmetry and sub-room modes. Moreover, the backend controller may use a different total number of double symmetry groups from that of the total number of sub-room groups. Further still, the geometric shape and size of the double symmetry groups may be different than the geometric shape and size of the sub-room groups. The backend controller may determine optimized shapes and sizes of transmitter groups based on the physical layout configuration of the transmitters and of the venue, for example.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A system for locating a target in a venue, the system comprising:
   a plurality of ultrasonic transmitters positioned within the venue according to a physical layout, each transmitter in the plurality of ultrasonic transmitters being configured to transmit ultrasonic ranging pulses in the venue for receipt by the target; and
   a backend controller, comprising a processor and a memory, the backend controller communicatively coupled to the plurality of ultrasonic transmitters, the backend controller being configured to activate the transmitters in a symmetry mode that comprises a plurality of symmetry transmitter groups, the transmitters in each symmetry transmitter group having a symmetry about a plurality of symmetry lines in the venue,
   the backend controller being configured to control each symmetry transmitter group to send a respective ranging pulse during a symmetry mode timeframe,
   the backend controller being further configured to receive location signal information during each of the symmetry mode timeframe of the symmetry mode, and
   the backend controller being further configured to determine, in response to the location signal information received during the symmetry mode, the location of the target in the venue.

2. The system of claim 1, wherein the backend controller is further configured to:
   activate the transmitters in a sub-room mode that comprises a plurality of sub-room transmitter groups different than the plurality of symmetry transmitter groups,
   the backend controller being configured to control each sub-room transmitter group to send a respective ranging pulse during a sub-room mode timeframe,
   the backend controller being further configured to receive location signal information during each of the sub-room mode timeframe, and
   the backend controller being further configured to determine, in response to the location signal information received during the symmetry mode and the location signal information received during the sub-room mode, the location of the target in the venue.

3. The system of claim 2, wherein the backend controller is configured to receive the location signal information received during the symmetry mode and the location signal information received during the sub-room mode from the target.

4. The system of claim 3, wherein the location signal information received during the symmetry mode and the location signal information received during the sub-room mode is timestamp data from the target.

5. The system of claim 1, wherein the symmetry mode is a double symmetry mode such that each symmetry transmitter group has symmetry about two orthogonal axes.

6. The system of claim 5, wherein the two orthogonal axes are a horizontal axis in the venue and a vertical axis in the venue.

7. The system of claim 5, wherein the double symmetry mode is defined by a plurality of repeating geometric cells.

8. The system of claim 7, wherein the repeating geometric cells are repeating rectangular shaped cells, square-shaped cells or repeating diamond-shaped cells.

9. A method of locating a target in a venue having a plurality of ultrasonic transmitters positioned within the venue, the method comprising:
   activating, using a backend controller communicatively coupled to the plurality of ultrasonic transmitters, the plurality of ultrasonic transmitters in a symmetry mode that comprises a plurality of symmetry transmitter groups, the transmitters in each symmetry transmitter group having a symmetry about a plurality of symmetry lines in the venue,
   transmitting, using the plurality of ultrasonic transmitters activated in the symmetry mode, ultrasonic ranging pulses in the venue during a symmetry mode timeframe;
   receiving location signal information during each of the symmetry mode timeframe; and
   determining, in response to the location signal information received during the symmetry mode, the location of the target in the venue.

10. The method of claim 9, further comprising:
    activating, using the backend controller, the transmitters in a sub-room mode that comprises a plurality of sub-room transmitter groups different than the plurality of symmetry transmitter groups;
    transmitting, using the plurality of ultrasonic transmitters activated in the sub-room mode, ultrasonic ranging pulses in the venue during a sub-room mode timeframe;
    receiving location signal information during each of the sub-room mode timeframe; and
    determining, in response to the location signal information received during the symmetry mode and the location signal information received during the sub-room mode, the location of the target in the venue.

11. The method of claim 10, further comprising:
    receiving, at the backend controller, the location signal information received during the symmetry mode from the target; and
    receiving, at the backend controller, the location signal information received during the sub-room mode from the target.

12. The method of claim 11, wherein the location signal information received during the symmetry mode and the location signal information received during the sub-room mode is timestamp data from the target.

13. The method of claim 9, wherein the symmetry mode is a double symmetry mode such that each symmetry transmitter group has symmetry about two orthogonal axes.

14. The method of claim 13, wherein the two orthogonal axes are a horizontal axis in the venue and a vertical axis in the venue.

15. The method of claim 13, wherein the double symmetry mode is defined by a plurality of repeating geometric cells.

16. The method of claim 15, wherein the repeating geometric cells are repeating rectangular shaped cells, square-shaped cells or repeating diamond-shaped cells.

17. An ultrasonic locationing system for locating a target in a venue, the system comprising:

a plurality of ultrasonic transmitters positioned within the venue, each transmitter being configured to transmit ultrasonic ranging pulses in the venue for receipt by the target; and a backend controller, comprising at least one processor and at least one memory, the backend controller communicatively coupled to the plurality of transmitters, the backend controller being configured to actuate the transmitters in different transmitter groups for sending ultrasonic ranging pulses, each transmitter group exhibiting symmetry about one or more symmetry lines in the venue, the backend controller being further configured to actuate each transmitter group in a sequential order each over a respective timeframe, and the backend controller being configured to receive location signal information during each of the timeframe and to determine a location of the target in the venue from the received location signal information obtained from the plurality of transmitter groups.

* * * * *